INVENTORS
John G. Meiler & Karl B. Bollerslev

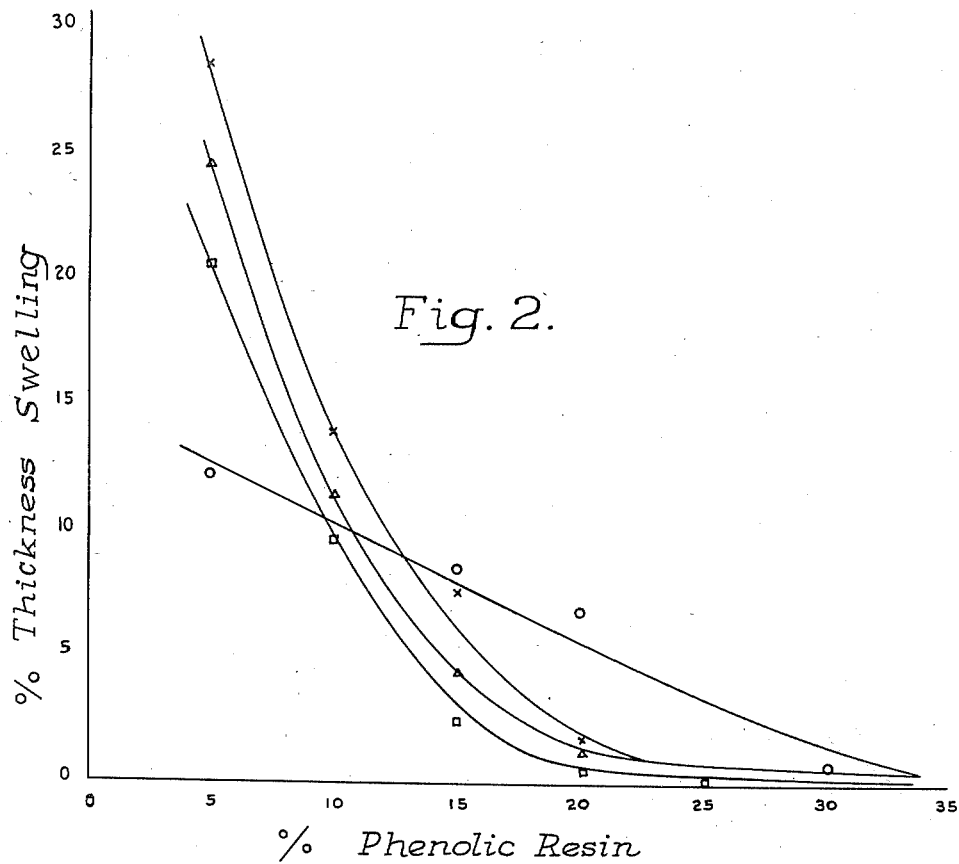

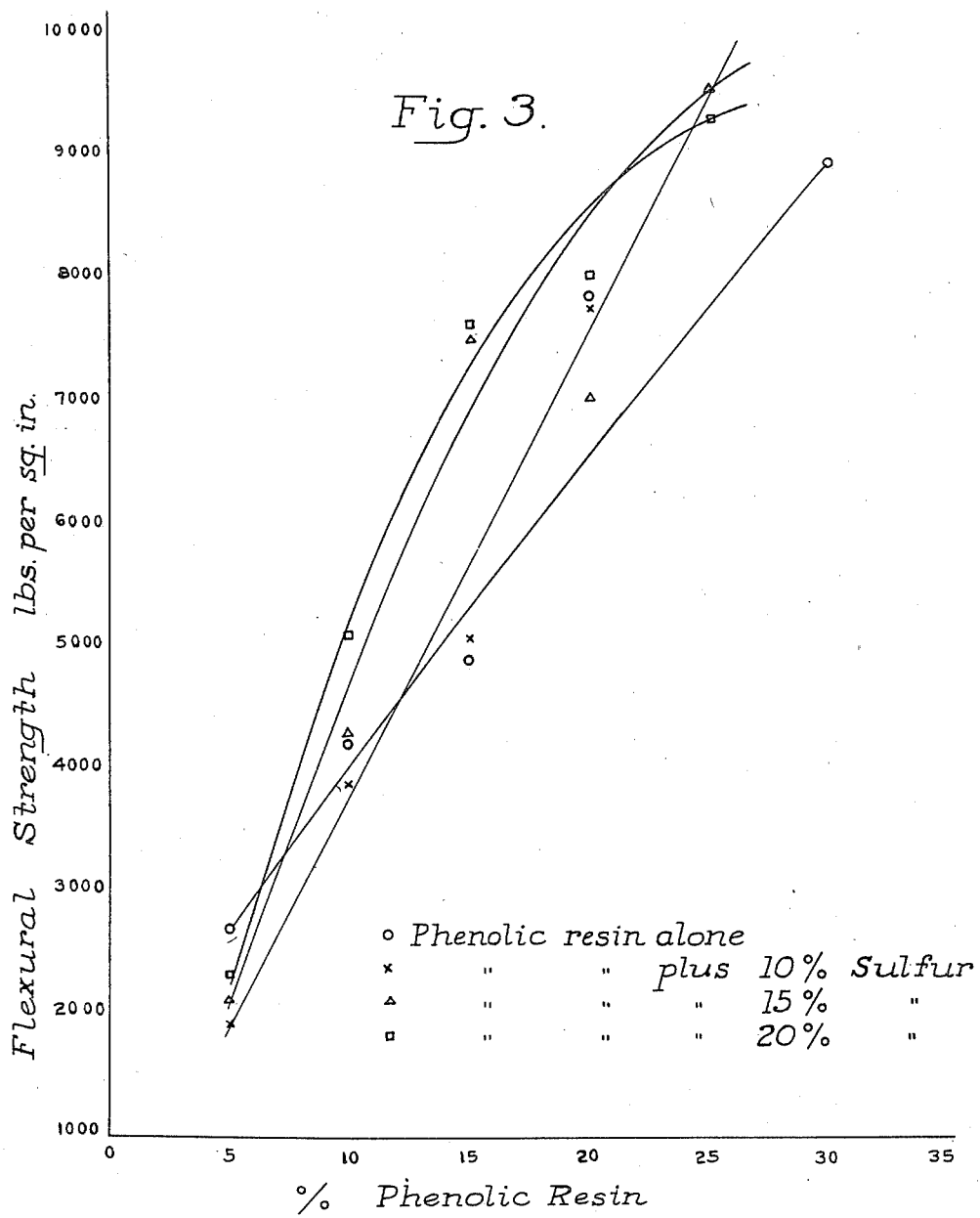

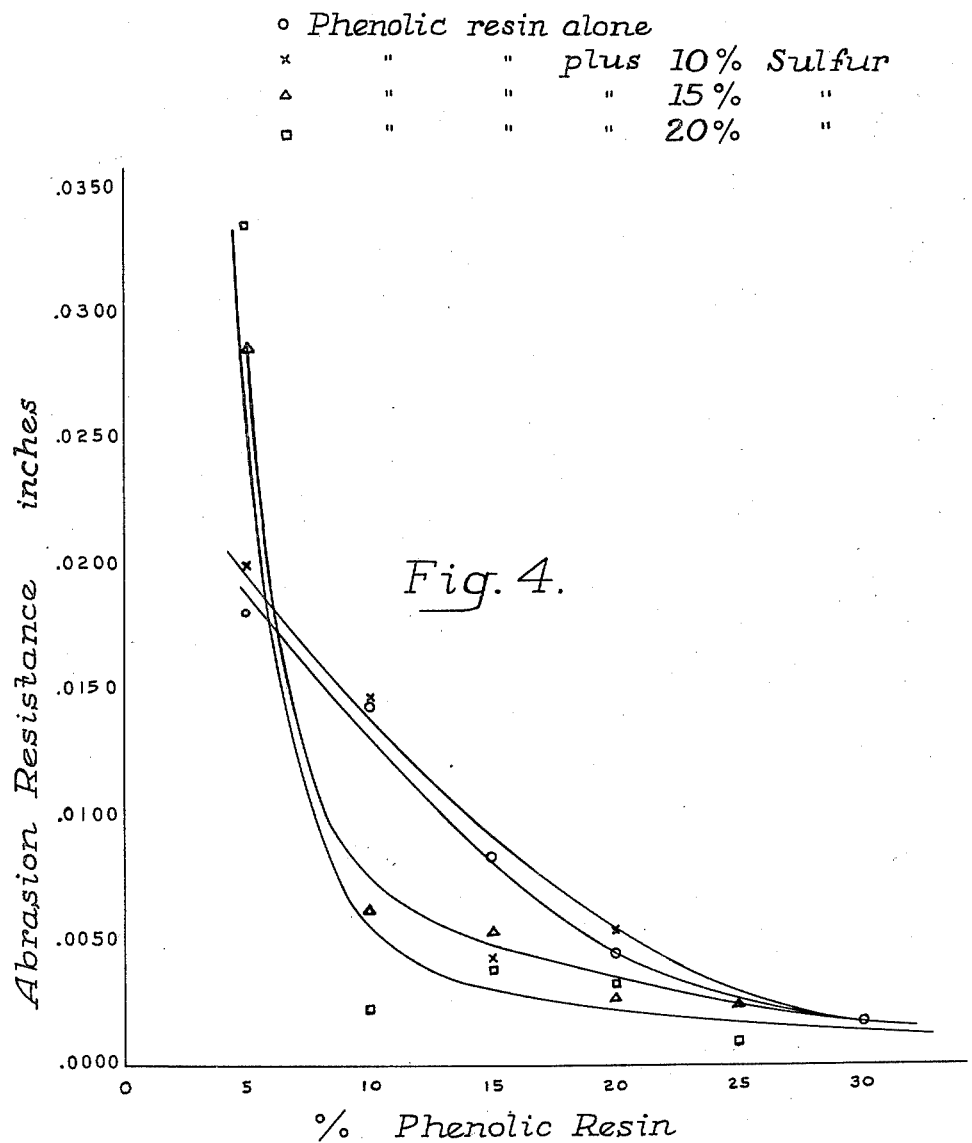

Patented May 2, 1950

2,505,782

UNITED STATES PATENT OFFICE 2,505,782

SULFUR CONTAINING MOLDING COMPOSITIONS, SULFUR CONTAINING CONSOLIDATED PRODUCTS, AND METHOD OF MAKING THE SAME

John G. Meiler and Karl B. Bollerslev, Tacoma, Wash., assignors to Plywood Research Foundation, Tacoma, Wash., a corporation of Washington Application June 15, 1948, Serial No. 33,008

14 Claims. (Cl. 260—17.2)

The present invention relates to sulfur containing molding compositions, to sulfur containing consolidated products, and to a method of making sulfur containing consolidated products. More particularly, the invention pertains to molding compositions adapted for use in the production of composite board products which compositions comprise finely divided lignocellulose material together with a binder comprising a thermosetting phenol-aldehyde resinous condensation product and sulfur.

In the manufacture of consolidated products and particularly composite boards such as hardboard, panel board, and flooring, it is common practice to consolidate a mixture comprising lignocellulose material and binder by the application of heat and pressure. The thermosetting phenol-aldehyde resinous condensation products, particularly the phenol-formaldehyde resins, frequently are employed as binders in such processes and lead to the production of consolidated products having very desirable properties of strength and water resistance. The use of these resins as binders is somewhat limited, however, because of their cost. It therefore would be desirable to provide a phenol-aldehyde type binding composition which may be used in the production of consolidated products having high strength and water resistance, but in which a substantial proportion of the phenol-aldehyde resin has been replaced with a relatively inexpensive material.

We have now discovered that, in molding compositions comprising lignocellulose material and phenol-aldehyde resinous binders, a large proportion, i. e. 50% or more, of the latter may be replaced with elemental sulfur to form compositions which after consolidation by the application of heat and pressure surprisingly and unexpectedly have strength and water resistance qualities which are at least equal to those of consolidated products formed through the agency of binders comprising unextended phenol-aldehyde resins. In addition, the abrasion resistance of the sulfur containing consolidated products is substantially superior to that of the comparable products containing no sulfur. This fact makes the compositions of the invention particularly applicable for use as flooring and in similar applications where they are subjected to abrasive wear.

These various properties of the consolidated products of the invention are illustrated in the accompanying drawings wherein:

Figure 2 shows the swelling characteristics upon exposure to moisture of consolidated products of the invention containing varying proportions of phenol-aldehyde resin and sulfur;

Figure 3 shows the flexural strengths (modulus of rupture in bending) of consolidated products of the invention containing varying proportions of phenol-aldehyde resin and sulfur; and Figure 4 shows the abrasion resistance as measured by a standard Taber abrasion tester of consolidated products of the invention containing varying proportions of phenol-aldehyde resin and sulfur.

Figure 1:
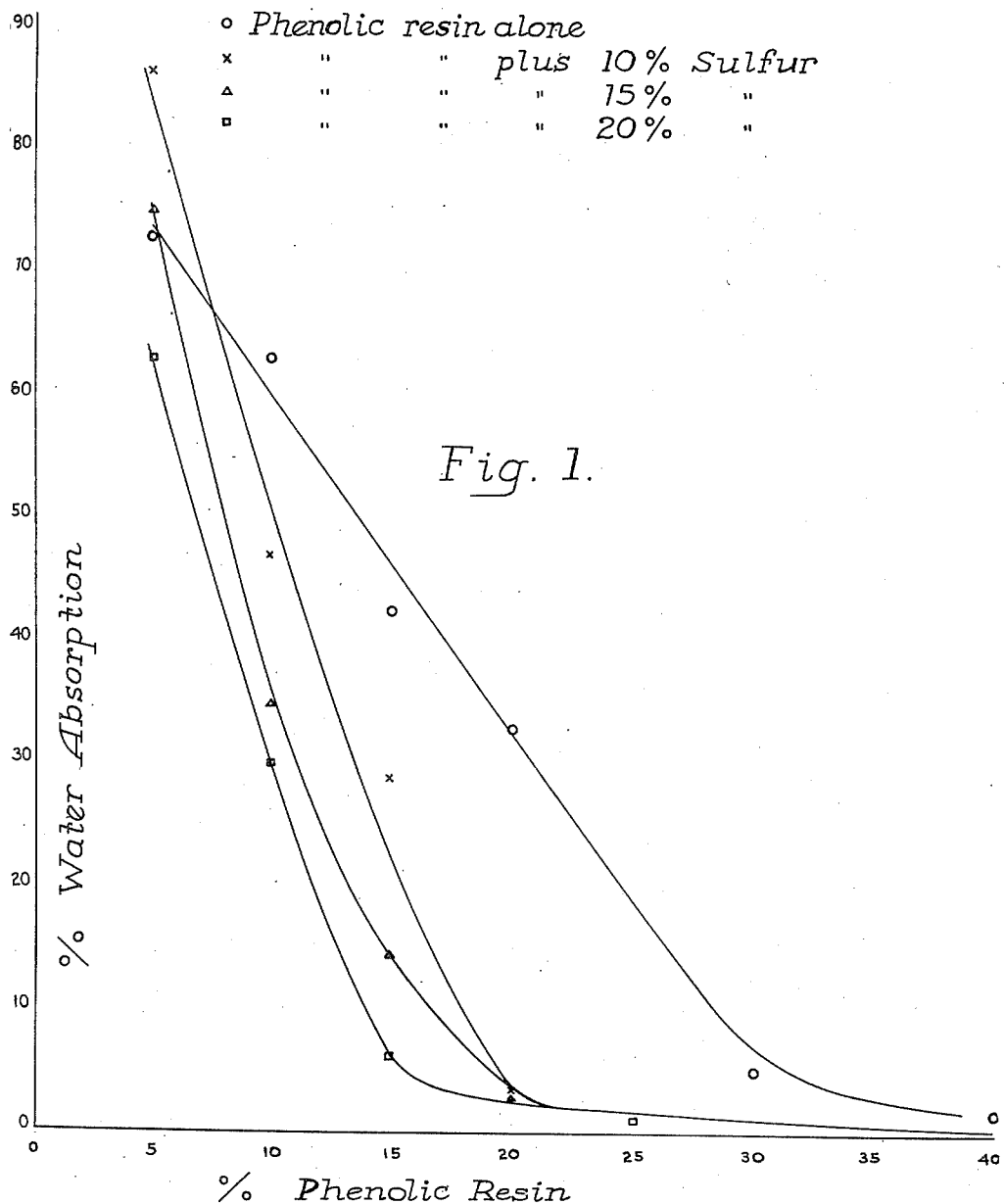
Figure 1 shows the water absorption characteristics of consolidated products of the invention containing varying proportions of phenol-aldehyde resin and sulfur.

A variety of lignocellulosic materials may be used as base materials in the compositions of the invention. Thus, there may be employed annual products such as corn stalks, corn cobs, straw, sugar cane, etc. as well as the wood from various species of trees, both hard and soft. The lignocellulose material preferably is in finely divided form, as in the case of sawdust, sander dust, wood fiber, or wood flour.

The phenol-aldehyde resinous condensation products which may be used as primary constituents of compositions for binding together the foregoing and other lignocellulosic base materials comprise the broad class of resins formed by condensing a phenol and an aldehyde in the presence of a suitable catalyst. They include for example the condensation products of phenol and formaldehyde, phenol and furfural, phenol and the substituted furfurals, the cresols and formaldehyde, the xylenols and formaldehyde, resorcinol and formaldehyde and the like. These various condensation products preferably are employed in the form of their aqueous suspensions and may be used singly or in admixture with each other. They are typified by the water miscible phenol-formaldehyde resinous condensation products marketed under the trade-name "Durez 12704," the same being an aqueous suspension containing about 70% by weight solids. They also are typified by the water miscible phenol-formaldehyde resinous condensation product under the trade name of "Plyophen 5015," which is an aqueous suspension containing from 68% to 70% by weight solids.

The sulfur employed to replace a portion of the phenol-aldehyde resinous condensation products content of the binder may be in the form of elementary sulfur such as is available on the market from any of the usual sources. It preferably should be relatively free from contaminating materials and in a finely divided form.

The relative proportions of phenol-aldehyde resin and sulfur are critical in formulating molding compositions having the properties desired for the purposes of the present invention. If too little resin is used, the consolidated products formed from the resulting molding compositions do not have the requisite qualities of water resistance and strength. If on the other hand an excessive amount of phenol-aldehyde resin is employed, the molding composition tends to flow and develop a spotty appearance when subjected to heat and pressure. Similarly if the percentage of sulfur employed is too low, the desirable properties in the consolidated products deriving from its use are not appreciably developed. If excessive quantities of sulfur are employed the molding compositions are subject to the same defect as obtains when excessive quantities of phenol-aldehyde resin are used, i. e. they tend to flow on consolidation to form consolidated products having a spotty appearance.

The molding compositions of the invention thus comprise from about 80% to about 50% by weight of lignocellulose material and from about 20% to about 50% by weight of binder, the amount of binder being in inverse proportion to the amount of lignocellulose material, and comprising from about 10% to about 30% by weight of phenol-aldehyde resin (based on the total weight of the molding composition) and from about 5% to about 40% sulfur (based on the total weight of the molding composition). Preferred molding compositions particularly suited for use in the production of composite board products comprise from about 80% to about 50% by weight lignocellulose material and from about 20% to about 50% by weight binder, the amount of binder being inversely proportional to the amount of lignocellulose material, and comprising from about 10% to about 20% phenol-aldehyde resin and from about 10% to about 20% sulfur; the weights of phenol-aldehyde resin and sulfur being based on the total weight of the molding composition. A typical molding composition of the invention may contain about 65% lignocellulose material, 15% phenol-aldehyde resin, and 15% to 20% sulfur, percent being expressed as percent by weight.

In preparing the molding compositions of the present invention, there preferably is formed first a mixture of the phenol-aldehyde resin and the sulfur. This then is mixed with the lignocellulose material, preferably in a batch or continuous type mixer of conventional construction. If preferred, however, the sulfur and phenol-aldehyde resin may be added individually to the lignocellulose material. Water or other fluid may be added during the mixing procedure in order to promote the mixing process and to facilitate thorough dispersion of the binder throughout the mass. After the mixing is complete, the finished molding composition is removed from the mixer and, if necessary, dried to a moisture content appropriate for the particular molding operation contemplated. If it is to be used in the production of composite board, its moisture content may be reduced, for example, to a value of less than about 100% by weight.

When used in the production of consolidated products, the molding compositions of the invention are placed in a suitable mold, for example a board making machine of conventional construction, and pressed under conditions of time, temperature and pressure sufficient to dry the mixture, cure the binder and compress the mass to a product of the desired density and dimensions. When producing a board having a density of between about 0.6 and about 1.3 and a final thickness of about one-quarter inch, pressing it at between about 100° C. and about 175° C. at pressures of between about 50 pounds per square inch and about 500 pounds per square inch for times of between about 2 minutes an about 30 minutes may be required. In the usual case, in order to produce such a board, it suffices to press the mixture for about 7 to 15 minutes at a temperature of about 125° C. to 165° C. and at a pressure of about 150 to 200 pounds per square inch.

The molding compositions of the invention and their application in the production of consolidated products are illustrated by the following examples, wherein the percentages of the constituents are expressed as percent by weight.

A series of molding compositions was prepared by mixing sawdust (through 20 mesh, retained by 80 mesh) with binders containing from 1% to 30% of a thermosetting phenol-formaldehyde condensation product ("Plyophen 5015" and "Durez 12704") and from 0 to 20% sulfur. The mixing operation was carried out in a stirring type mixer, in which the sawdust was placed first, the previously mixed sulfur and phenol-formaldehyde resin being added gradually and with continuous agitation. Water was added as necessary in order to secure uniform dispersion of the binder throughout the mass. After the mixing was complete, the composition was removed from the mixer and dried to a moisture content of 10%. It then was placed in a chase (form) between the platens of a press and pressed at 125 to 155° C. and 175 to 200 pounds per square inch for from 7 to 15 minutes. The resulting boards, which had a thickness of about one-quarter inch, were removed from the press hot.

The board samples prepared as described above then were subjected to various tests to measure their flexural strength, water resistance, and resistance to abrasion. Their flexural strengths (modulus of rupture in bending) were measured by the standard test method for determining these values. Their water resistance was measured by accurately weighing and measuring samples having approximate dimensions of one-half inch by six inches and then soaking them in water at about 75° F. for 24 hours. The samples then were removed from the water and again weighed and measured. The water absorption was calculated as the increase in weight, expressed as percent of the original weight, and the thickness swelling as the increase in thickness, expressed as percent of the original thickness.

The abrasion resistance of the samples was measured by means of a standard Taber abrasion tester employing wheel #CS17. After ten thousand revolutions of the wheel the thickness of the sample was measured in four places and the average average difference in thickness, expressed in inches (before and after abrading) was determined.

The following examples illustrate the molding compositions of the invention containing 10% of phenol-aldehyde resin together with from 0 to 20% sulfur.

| Example Number | 1 | 2 | 3 | 4 |
|---|---|---|---|---|
| Phenol Aldehyde Resin_percent | 10 | 10 | 10 | 10 |
| Sulfur_____do____ | | 10 | 15 | 20 |
| Water Absorption_____do____ | 63.1 | 47.0 | 35.0 | 30.0 |
| Swelling (Thickness)____do____ | 13.9 | 14.0 | 11.4 | 9.8 |
| Flexural Strength_____p. s. i__ | 4,230 | 3,900 | 4,300 | 5,190 |
| Specific Gravity_____ | 0.67 | 0.94 | 0.92 | 0.97 |
| Abrasion Resistance____inches__ | 0.0143 | 0.0148 | 0.0063 | 0.0022 |

The following examples illustrate the molding compositions of the invention containing 15% phenol-aldehyde resin and from 0 to 20% sulfur.

| Example Number | 5 | 6 | 7 | 8 |
|---|---|---|---|---|
| Phenol Aldehyde Resin_percent | 15 | 15 | 15 | 15 |
| Sulfur_____do____ | | 10 | 15 | 20 |
| Water Absorption_____do____ | 42.7 | 27.3 | 14.3 | 6.1 |
| Swelling (Thickness)____do____ | 8.6 | 7.7 | 4.4 | 2.6 |
| Flexural Strength_____p. s. i__ | 4,872 | 5,120 | 7,590 | 7,650 |
| Specific Gravity_____ | 0.74 | 0.89 | 0.88 | 1.04 |
| Abrasion Resistance____inches | 0.0083 | 0.0043 | 0.0054 | 0.004 |

The following examples illustrate the molding compositions of the invention containing 20% phenol-aldehyde resin and from 0 to 20% sulfur.

| Example Number | 9 | 10 | 11 | 12 |
|---|---|---|---|---|
| Phenol Aldehyde Resin_percent | 20 | 20 | 20 | 20 |
| Sulfur_____do____ | | 10 | 15 | 20 |
| Water Absorption_____do____ | 35.4 | 3.7 | 2.9 | 2.5 |
| Swelling (Thickness)____do____ | 6.8 | 1.6 | 1.3 | 0.4 |
| Flexural Strength_____p. s. i__ | 7,900 | 7,800 | 7,060 | 8,050 |
| Specific Gravity_____ | 0.87 | 1.06 | 1.14 | 1.13 |
| Abrasion Resistance____inches__ | 0.0053 | 0.0053 | 0.0028 | 0.0032 |

The following examples illustrate molding compositions of the invention containing higher percentages of phenol-aldehyde resin together with 15 and 20% sulfur.

| Example Number | 13 | 14 | 15 |
|---|---|---|---|
| Phenol Aldehyde Resin_____per cent__ | 25 | 25 | 30 |
| Sulfur_____do____ | 15 | 20 | |
| Water Absorption_____do____ | 1.0 | 1.0 | 5.2 |
| Swelling (Thickness)_____do____ | 0.0 | 0.0 | 0.5 |
| Flexural Strength_____p. s. i__ | 9,400 | 9,180 | 9,000 |
| Specific Gravity_____ | 1.36 | 1.25 | 0.99 |
| Abrasion Resistance_____inches__ | 0.0025 | 0.0010 | 0.0019 |

In a manner similar to that described above in connection with the preparation of the molding compositions of Examples 1 to 15, inclusive, there may be prepared molding compositions and consolidated products using the following in place of the phenol-formaldehyde resinous binder of those examples: resinous condensation products of phenol and acetaldehyde, the cresols and formaldehyde, the xylenols and formaldehyde, resorcinol and formaldehyde and furfural and formaldehyde.

It will be apparent from a consideration of the test data of the examples, as presented in the drawings, that by the incorporation of substantial amounts of sulfur together with a phenol-aldehyde resinous binder in accordance with the method of the present invention, the amount of phenol-aldehyde resin used may be reduced very materially, with attendant reduction in cost, but without sacrificing desirable qualities. The resulting sulfur containing consolidated products have flexural strengths and qualities of water resistance, as great or greater than consolidated products containing no sulfur but higher percentages of phenol-aldehyde resins. As is clearly apparent from the drawings consolidated products containing a binder comprising 15% by weight phenol-aldehyde resin together with from 15% to 20% by weight sulfur are far superior in water resistance and flexural strength to consolidated products having a binder comprising the same amount of phenol-aldehyde resin but without added sulfur. Such sulfur containing consolidated products are, in fact, the full equivalent in strength and water resistance of consolidated products containing as much as 30% phenol-aldehyde resin and no sulfur. In addition, the sulfur containing consolidated compositions have superior abrasion resistance, a factor which makes them highly useful in certain applications, as in the production of flooring and similar materials.

Having now described the invention in preferred embodiments, what is claimed as new and desired to protect by Letters Patent is:

1. A molding composition for use in the production of consolidated products having high water resistance, high flexural strength, and high resistance to abrasion which comprises from about 80% to about 50% by weight lignocellulose material and from about 20% to about 50% by weight of binder, the amount of binder being inversely proportional to the amount of lignocellulose material, said binder comprising from about 10% to about 30% by weight of a phenol-adehyde resin, based on the total weight of the molding composition, and from about 5% to about 40% by weight sulfur, based on the total weight of the molding composition.

2. A molding composition for use in the production of consolidated products having high water resistance, high flexural strength, and high resistance to abrasion which comprises from about 80% to about 50% by weight lignocellulose material and from about 20% to about 50% by weight of binder, the amount of binder being inversely proportional to the amount of lignocellulose material, said binder comprising from about 10% to about 30% by weight of a resinous condensation product of phenol and formaldehyde, based on the total weight of the molding composition, and from about 5% to about 40% by weight sulfur, based on the total weight of the molding composition.

3. A molding composition for use in the production of consolidated products having high water resistance, high flexural strength, and high resistance to abrasion which comprises from about 80% to about 50% by weight wood in finely divided form and from about 20% to about 50% by weight of binder, the amount of binder being inversely proportional to the amount of wood, said binder comprising from about 10% to about 30% by weight of a phenol-aldehyde resin, based on the total weight of the molding composition, and from about 5% to about 40% by weight sulfur, based on the total weight of the molding composition.

4. A molding composition for use in the production of consolidated products having high water resistance, high flexural strength, and high resistance to abrasion which comprises from about 80% to about 50% by weight lignocellulose material and from about 20% to about 50% by weight of binder, the amount of binder being inversely proportional to the amount of lignocellulose material, the binder comprising from about 10% to about 20% by weight of a resinous condensation product of phenol and formaldehyde and from about 10% to about 20% by weight of sulfur, the amounts of phenol formaldehyde resinous condensation product and sulfur being based on the total weight of the molding composition.

5. A molding composition for use in the production of consolidated products having high water resistance, high flexural strength, and high resistance to abrasion which comprises about 65% finely divided wood, about 15% of a resinous condensation product of phenol and formaldehyde, and from about 15% to about 20% of sulfur, per cent being expressed as per cent by weight.

6. The method of making consolidated products which comprises forming a mixture comprising from about 80% to about 50% by weight lignocellulose material and from about 20% to about 50% by weight of binder, the amount of binder being inversely proportional to the amount of lignocellulose material, the binder comprising between about 10% and about 30% by weight (of the said mixture) of a phenol-aldehyde resin and between about 5% and about 40% by weight (of said mixture) of sulfur, and consolidating the said mixture by the application of heat and pressure.

7. The method of making consolidated products which comprises forming a mixture comprising from about 80% to about 50% by weight lignocellulose material and from about 20% to about 50% by weight of binder, the amount of binder being inversely proportional to the amount of lignocellulose material, the binder comprising between about 10% and about 30% by weight (of the said mixture) of a phenol-aldehyde resin and between about 5% and about 40% by weight (of said mixture) of sulfur, and consolidating the said mixture by pressing it at between about 50 and about 500 pounds per square inch and at between about 125° C. and about 165° C. for a time of between about two minutes and about 30 minutes.

8. The method of making consolidated products which comprises forming a mixture comprising from about 80% to about 50% by weight lignocellulose material and from about 20% to about 50% by weight of binder, the amount of binder being inversely proportional to the amount of lignocellulose material, the binder comprising between about 10% and about 30% by weight (based on the total weight of said mixture) of a resinous condensation product of phenol and formaldehyde and between about 5% and about 40% by weight (based on the total weight of said mixture) of sulphur, and consolidating the said mixture by the application of heat and pressure.

9. The method of making consolidated products which comprises forming a mixture comprising from about 80% to about 50% by weight lignocellulose material and from about 20% to about 50% by weight of binder, the amount of binder being inversely proportional to the amount of lignocellulose material, the binder comprising between about 10% and about 30% by weight (based on the total weight of said mixture) of a resinous condensation product of phenol and formaldehyde and between about 5% and about 40% by weight (based on the total weight of said mixture) of sulfur, and consolidating the said mixture by pressing at between about 175 pounds per square inch and about 200 pounds per square inch and at a temperature of between about 125° C. and about 165° C. for a time of between about 7 minutes and about 15 minutes.

10. The method of making consolidated products which comprises forming a mixture comprising from about 80% to about 50% by weight wood in finely divided form and from about 20% to about 50% by weight of binder, the amount of binder being inversely proportional to the amount of wood, the binder comprising between about 10% and about 30% by weight (based on the total weight of said mixture) of a resinous condensation product of phenol and formaldehyde and between about 5% and about 40% by weight (based on the total weight of said mixture) of sulfur, and consolidating the said mixture by pressing at between about 175 pounds per square inch and about 200 pounds per square inch and at a temperature of between about 125° C. and about 165° C. for a time of between about 7 minutes and about 15 minutes.

11. As a new article of manufacture, the consolidated product comprising from about 80 parts to about 50 parts lignocellulose material and from about 20 parts to about 50 parts by weight of binder, the amount of binder being inversely proportional to the amount of lignocellulose material, the binder comprising from between about 10% to about 30% by weight (of said mixture) of phenol-aldehyde resin and between about 5% and about 40% by weight (of said mixture) of sulfur, said mixture having been consolidated by the application of heat and pressure.

12. As a new article of manufacture, the consolidated product comprising from about 80 parts to about 50 parts wood in finely divided form and from about 20 parts to about 50 parts by weight of binder, the amount of binder being inversely proportional to the amount of wood, the binder comprising from between 10% to about 30% by weight (of said mixture) of phenol-aldehyde resin and between about 5% and about 40% by weight (of said mixture) of sulfur, said mixture having been consolidated by the application of heat and pressure.

13. As a new article of manufacture, the consolidated product comprising from about 80 parts to about 50 parts lignocellulose material and from about 20 parts to about 50 parts by weight of binder, the amount of binder being inversely proportional to the amount of lignocellulose material, the binder comprising from between about 10% to about 30% by weight (of said mixture) of a resinous condensation product of phenol and formaldehyde and between about 5% and about 40% by weight (of said mixture) of sulfur, said mixture having been consolidated by the application of heat and pressure.

14. As a new article of manufacture, the consolidated product comprising a mixture comprising from about 80% to about 50% by weight of wood in finely divided form and between about 20% and about 50% by weight of binder, the amount of binder being inversely proportional to the amount of wood, the binder comprising between about 10% and about 20% by weight (of said mixture) of a resinous condensation product of phenol and formaldehyde and between about 10% and 20% by weight (of said mixture) of sulfur, the said mixture having been consolidated by being subjected to a pressure of between about 50 pounds per square inch and about 500 pounds per square inch and a temperature of between about 100° C. and about 175° C. for a time of between about 2 minutes and about 30 minutes.

JOHN G. MEILER.
KARL B. BOLLERSLEV.

REFERENCES CITED

The following references are of record in the file of this patent:

UNITED STATES PATENTS

| Number | Name | Date |
|---|---|---|
| 1,636,596 | Ellis | July 19, 1927 |
| 1,704,629 | Samuel | Mar. 5, 1929 |
| 1,787,618 | Ellis | Jan. 6, 1931 |